May 17, 1932.  E. WIGLE  1,858,652
HOEING ATTACHMENT FOR CULTIVATORS
Filed June 15, 1929  2 Sheets-Sheet 2
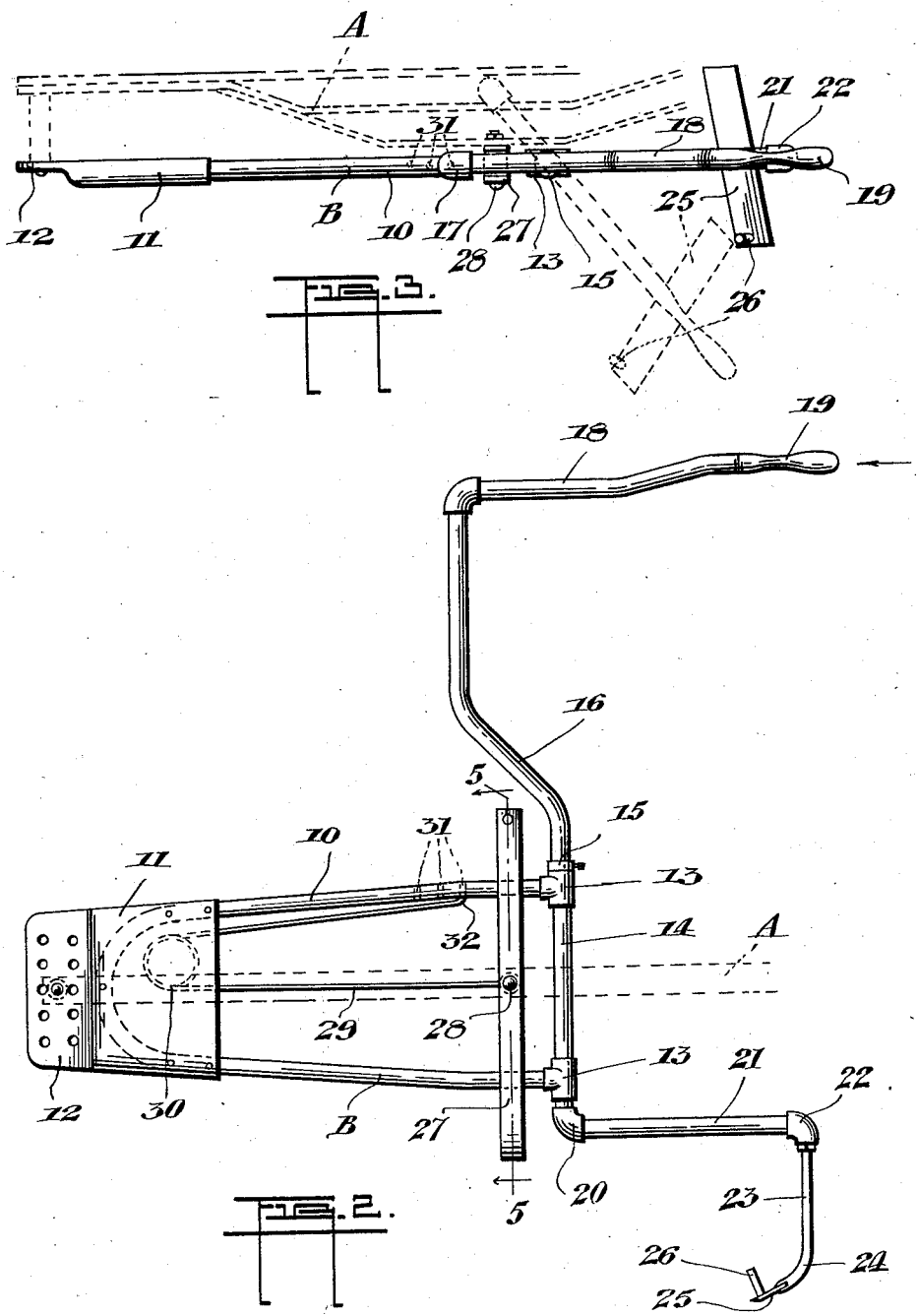
Inventor
Everett Wigle
BY
ATTYS.

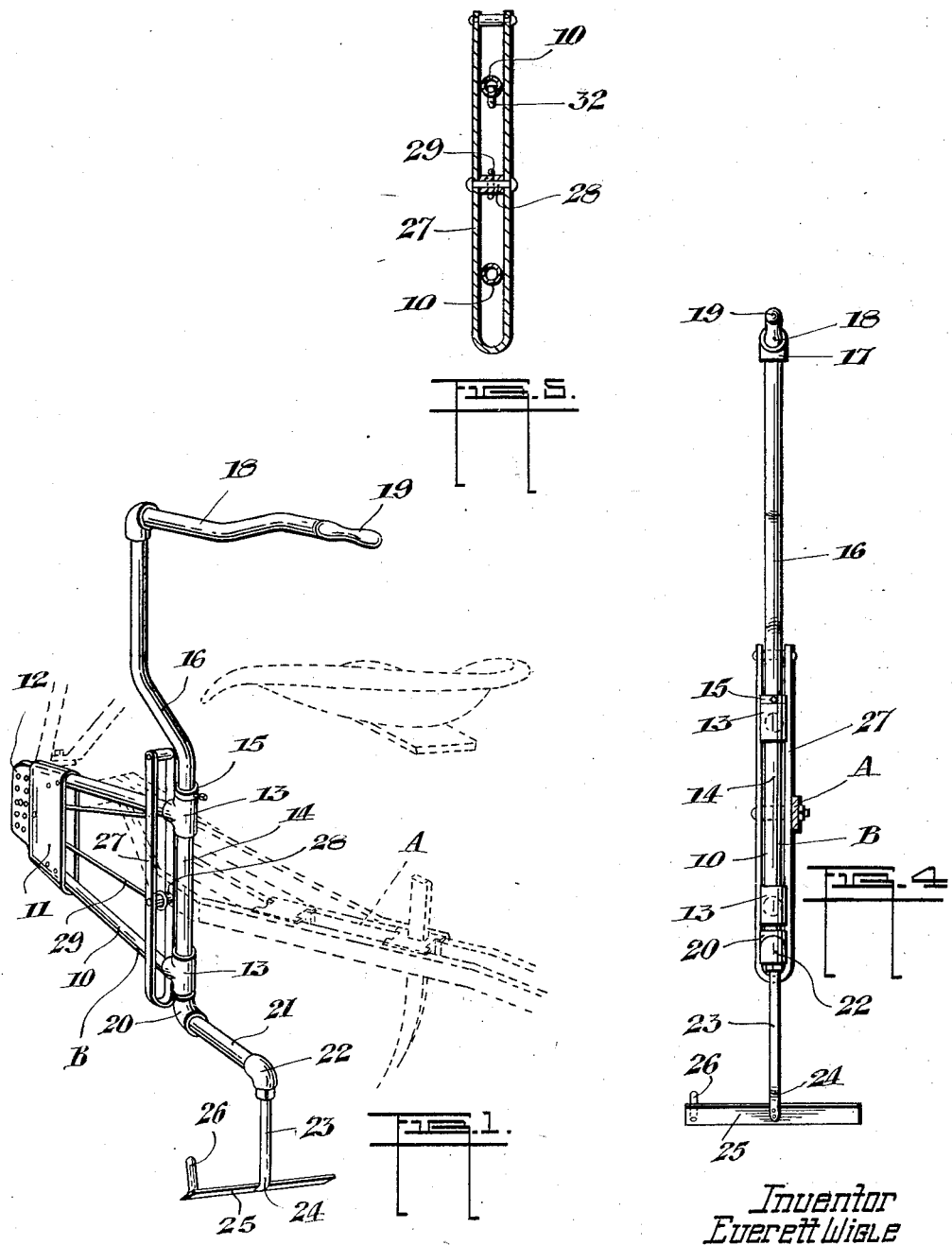

Patented May 17, 1932

1,858,652

UNITED STATES PATENT OFFICE

EVERETT WIGLE, OF KINGSVILLE, IN GOSFIELD SOUTH TOWNSHIP, ESSEX COUNTY, ONTARIO, CANADA

HOEING ATTACHMENT FOR CULTIVATORS

Application filed June 15, 1929. Serial No. 371,204.

This invention relates to improvements in hoeing attachments for cultivators, and an object of the invention is to provide a hoeing device which is of simple and durable structure and which will efficiently perform the functions required of it.

A further object of the invention is to provide a hoeing attachment which may be readily attached to standard makes of cultivators.

A further object of the invention is to provide a device of the character in which the hoe may be operated at various angles desired.

With these and other objects in view the invention consists essentially of a light framework adapted to carry an oscillatable standard controlled by a lever arm and adapted to carry the hoeing attachment, the whole being adaptable for mounting on a cultivator framework as more fully described in the following specification and illustrated in the accompanying drawings which form part of the same and in which:

Figure 1 is a perspective view of the hoeing attachment illustrating its position with respect to the cultivator frame which is shown in dotted lines.

Figure 2 is a side elevation of the hoeing attachment.

Figure 3 is a plan view thereof.

Figure 4 is an end elevation showing the cultivator frame in section, and

Figure 5 is a section on the line 5—5 of Fig. 2.

Referring to the drawings, A indicates a cultivator frame and B indicates a hoeing attachment as a whole in the form of a unit attached to the cultivator frame and consisting essentially of the frame 10 of any convenient form, here shown substantially U-shaped and provided at its forward end with a housing 11 terminating in a clevice plate or attachment plate 12 which is suitably perforated for adjustable attachment with the cultivator frame. This is accomplished through any suitable bolt connection such as shown. On the rearward end of the frame, bearing members are provided of any suitable form which may be tubular T joint members 13 which are screw threaded on the ends of the frame 10 and adapted to have journalled therein an oscillatable standard member 14.

An adjustment collar or the like 15 is provided on the standard cooperating with the bearing members 13 and the standard extends upwardly and may be bent as at 16 according to requirements, terminating in a connection member of any suitable type 17, here shown as an elbow. An operating lever 18 is connected to the elbow or the connecting means used and this may be suitably bent according to conditions, terminating in a handle 19 which is so formed as to permit of adjustment according to the angle of the standard 14 and inclined portion 16.

On the lower part of the standard member 14 a further connection member 20 is positioned, here shown as an elbow and connected therewith is a lateral arm 21 having on its outer end a connecting member 22 similar to the connecting member 20, and depending from this connecting member is a hoe carrying standard 23, the connection of course being such as to provide for adjustment of the standard. The hoe carrying standard may be suitably curved as at 24 and is adapted to rigidly connect with a hoe blade 25, the connecting point being at the centre of the hoe blade.

A salient feature of the invention consists in the provision of a guiding post 26 on the hoe blade 25 which is positioned at the edge of one end of the blade. The guiding post, as will be noted particularly in Figs. 1 and 2 extends upwardly from the blade and when the attachment is in operation this guiding post will be viewed above the soil so as to form a guiding means whereby the operator will readily avoid contacting with and injuring plants or the like.

In mounting the attachment on the cultivator frame for obtaining resiliency of action, I provide a U-shaped bracket member 27 which extends around the frame 10 and is connected at its open end by means of a bolt or the like. At a central point on the bracket I provide an anchoring point which may take the form of a bolt and sleeve 28. This bolt serves to rigidly secure the U-shaped bracket to the cultivator frame as indicated in Fig. 3 in addition to forming an anchoring point for one end of a spring 29. The spring is of substantially U-shaped formation coiled at one end as at 30, which end is adapted to extend and loosely lie in the housing 11.

On the upper portion of the framework 10, I provide a series of orifices 31 and the other end of the spring 29 is adapted to connect with the frame and enter into these orifices by means of an upwardly turned portion 32 of the spring, the particular orifice 31 used being in accordance with the adjustment required. From this it will be seen that the whole attachment is resiliently mounted on the cultivator frame and accordingly in travelling during operation it will be readily adaptable to the contour of the ground on which it is worked.

It will be readily understood, of course, that ball bearings and the like are provided throughout the construction of the attachment and that other forms of connecting joints are readily applicable to the structure.

In operation, after the attachment has been secured to the cultivator frame in the aforementioned manner, the operating lever 18 lies adjacent the operating seat and this may be operated to the angle desired to correspondingly adjust the position of the hoe blade 25 to effect the required hoeing, while as the machine travels over the ground, the hoe blade 25 is travelling under the ground and the guide post 26 is readily perceptible to the operator and prevents him from cutting into or destroying plants unawares, which may be avoided of course by the operation of the lever 18.

From the foregoing it will be seen that I have provided a simple and efficient form of hoeing attachment for cultivators in which the connecting members such as the operating lever 18 and the lateral arm 21 are adjustable through various angles apart from the operation of the standard by the turning of such members and their connecting members so as to provide a device which is adaptable to varying conditions.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. The combination with a cultivator, of a hoeing attachment comprising a light, durable, substantially U-shaped framework, bearing members carried by the framework, an oscillatable standard member journalled in the bearings and adapted to operatively carry a hoe blade, means for moving the standard to correspondingly adjust the position of the hoe, means for resiliently mounting said attachment on a cultivator frame, and a housing adapted to partially encase the resilient mounting.

2. The combination with a cultivator, of a hoeing attachment comprising a light, durable framework, bearing members formed on the framework, an oscillatable standard member journalled in the bearings and adapted to move about its axis, a hoe blade adjustably carried by the standard member, an operating lever adapted to move the standard to change the position of the hoe adjustably mounted on the standard, means for resiliently mounting said attachment on a cultivator frame, and a housing for partially encasing the resilient mounting.

3. The device as claimed in claim 2 in which the resilient mounting comprises a U-shaped bracket adapted to extend around the frame, an anchoring point formed on the U-shaped bracket, a spring anchored to the U-shaped member at the anchoring point formed with arms extending between the frame pieces and connected with the frame, said U-shaped bracket being attached to the cultivator frame substantially at the spring anchoring point.

4. The combination with a cultivator, of a hoeing attachment comprising a light, durable, substantially U-shaped framework, bearing members carried by the framework, a standard journalled in the bearing members and adapted to operatively carry a hoeing blade rearwardly thereof, an operating lever connected to the standard for turning said standard through different angles to adjust the position of the hoe, means for adjusting the operating lever, a housing formed on the forward part of the framework, means for resiliently mounting said framework on a cultivator including a U-shaped bracket extending around the framework, connected to the cultivator framework and formed with an anchoring point thereon, a spring anchored to said bracket at said anchoring point coiled at one end and adapted to connect with the hoeing attachment framework, said coiled end extending into the housing, and adjustable means on the standard for adjusting the position of the standard with respect to the bearing members.

5. The combination with a cultivator, of a hoeing attachment comprising a unit including a light, durable framework, an oscillatable standard member carried by the framework, a hoe carried by the standard, means for resiliently securing the attachment to a cultivator, and manually operable means in connection with the standard for operating said hoe through various working angles.

In witness whereof I have hereunto set my hand.

EVERETT WIGLE.